3,030,392
POLYMERS FROM POLYEPOXY ACID ESTERS AND BORIC ACID
James A. Bralley and Hans Wolff, Decatur, Ill., assignors to A. E. Staley Manufacturing Company, Decatur, Ill., a corporation of Delaware
No Drawing. Filed June 24, 1958, Ser. No. 744,043
3 Claims. (Cl. 260—398)

This invention relates to new compositions of matter comprising the condensation products of polyepoxy fatty acid esters with polybasic inorganic acids.

We have discovered that new and useful substances are obtained by reacting polyepoxy fatty acid esters with polybasic inorganic acids in the absence of catalysts. The reaction products vary in physical properties from viscous liquids at room temperature, soluble in selected solvents, to substantially infusible and insoluble solids. They are useful generally in protective coatings, in fire-retarding compositions and in foamed products. The new substances are thought to be polyesters formed by opening of oxirane rings with the functional group of the acid.

The chief object of our invention is to provide new and useful substances formed by reaction of polyepoxy fatty acid esters with polybasic inorganic acids.

Additional objects will appear during the following description of the invention.

As previously indicated, the foregoing objects are achieved according to our invention by reacting polyepoxy fatty acid esters with polybasic inorganic acids in the absence of catalysts.

Polyepoxy fatty acid esters suitable for this invention are derivable from the naturally occurring or synthetic unsaturated higher fatty acids containing two or more carbon-carbon double bonds, and a total of 8 to 22 carbon atoms. Naturally occurring glycerides are suitable provided they contain two or more oxirane groups per glyceride molecule. The unsaturated acids may be esterified with a wide variety of alcohols. Suitable alcohols are monohydric aliphatic alcohols such as methyl, ethyl, propyl, butyl, and the like; also polyhydric alcohols such as the glycols, polyethylene glycols, glycerol, and polyglycerols. Equally suitable are the aromatic alcohols such as phenol, aralkyl alcohols such as benzyl alcohol, and cycloaliphatic alcohols such as cyclohexanol.

In accordance with our invention, the polyepoxy fatty acid ester molecule may contain as few as two oxirane groups. The epoxy esters are prepared by known methods.

Any of the nonoxidizing polybasic inorganic acids are adaptable to our invention. Typical examples are boric acid ($H_3BO_3$), phosphoric acid ($H_3PO_4$), and phytic acid ($CH_3PO_4)_6$.

The following examples are preferred embodiments of our invention:

*Example 1*

A mixture of 25 grams of epoxidized soybean oil (6.5% oxirane oxygen by weight) and 6 grams of boric acid was heated to 130° C. An exothermic reaction occurred, water was released as steam, and a white foamy factice-like solid product was obtained. It was found to be insoluble in water and the common organic solvents. It was infusible and noninflammable. Extraction with hot water yielded practically no boric acid. Saponification and acidulation of a sample of the product yielded an oily liquid which gave a positive test for vicinal hydroxyl groups.

*Example 2*

Repetition of the procedure of Example 1, using 2 grams instead of 6 grams of boric acid yielded a similar product.

*Example 3*

A mixture of 25 grams of epoxidized 2-ethyl-butyl esters of soybean fatty acids (3.7% by weight of oxirane oxygen, 2.9 iodine value) and 1.44 grams of boric acid was heated to 130° C. The reaction product was a brown viscous liquid soluble in toluene, chloroform, benzene, and similar organic solvents. It had an oxirane oxygen content of 0.52% by weight and an iodine value of 3.3. A hot water extract of the reaction product contained no boric acid or boron compound.

*Example 4*

A mixture of 25 grams of epoxidized methyl esters of soybean fatty acids (6.3% by weight of oxirane oxygen, 2.3 iodine value) and 2.04 grams of boric acid was heated to 130° C. Foaming occurred, and a brown viscous liquid was obtained. The reaction product had an oxirane oxygen content of 0.3% by weight, an iodine value of 3.7, an acid value of 15, and a saponification number of 202.

*Example 5*

Boric acid (12.6 grams) was refluxed in 60 grams of toluene, with trapping of liberated water, until no more water was released. The quantity of water thus obtained was 3.6 grams. The dehydrated boric acid and toluene were then mixed with 42 grams of epoxidized soybean oil (6.4% by weight of oxirane oxygen) and heated to 130° C. Additional water (0.9 gram) was liberated and a solid reaction product similar to that obtained in Example 1 precipitated from the toluene solution.

*Example 6*

Epoxidized soybean oil (50 grams) containing 6.4% oxirane oxygen by weight was cooled to 7° C. and mixed with 5.6 grams of syrupy (85%) orthophosphoric acid. An exothermic reaction occurred which transformed the epoxidized soybean oil into a soft factice-like product. The reaction product was insoluble in the usual organic liquids. It had a tack temperature of about 53° C., a melting point of about 152° C., and started to decompose at 200° C. It darkened and softened after 24 hours heating in air at 120° C.

*Example 7*

A mixture of 40 grams of epoxidized soybean oil (6.4% by weight of oxirane oxygen) and 20 grams of 70% aqueous solution of phytic acid was heated to 60° C. An exothermic reaction occurred, raising the temperature of the mixture to 75° C. and greatly increasing its viscosity. The reaction product, a soft gel, had a tack temperature of about 45° C., a melting point range of 85–140° C., and began decomposing when heated to 180° C.

The ratio of acid active hydrogens to oxirane groups in the reactants is not critical. Although maximum interaction and product modification is obtained at a ratio of about one oxirane group per active hydrogen, useful products are obtained at widely different ratios.

If the reactants provide less than one oxirane group per active hydrogen, the reaction products will contain free inorganic acid and possess a high acid value. Although the presence of such acid will not prevent use of the product in many instances, it will usually be objectionable.

If, on the other hand, the reactants furnish more than one oxirane group per active hydrogen, the reaction product will seldom contain appreciable free acid. The physical properties and oxirane oxygen content of the product will vary with the ratio of reactive groups.

In the table below are listed the quantities and mole ratios of reactants in the foregoing examples. It will be seen that the ratio of gram moles of boric acid to gram moles of oxirane oxygen has a range of about 0.3 to about 1.2.

| Example | Grams Boric Acid | Gram Moles Boric Acid (1) | Grams Epoxy Compound | Percent Oxirane Oxygen | Grams Oxirane Oxygen | Gram Moles Oxirane Oxygen (2) | Ratio (1)/(2) |
|---|---|---|---|---|---|---|---|
| 1 | 6 | 0.097 | 25 | 6.5 | 1.625 | 0.102 | 0.95 |
| 2 | 2 | 0.032 | 25 | 6.5 | 1.625 | 0.102 | 0.31 |
| 3 | 1.44 | 0.023 | 25 | 3.7 | 0.92 | 0.058 | 0.4 |
| 4 | 2.04 | 0.033 | 25 | 6.3 | 1.575 | 0.099 | 0.33 |
| 5 | 12.6 | 0.204 | 42 | 6.4 | 2.688 | 0.167 | 1.22 |

We claim:
1. New composition of matter consisting essentially of the condensation product of boric acid and a polyepoxy ester derived from at least one monocarboxylic fatty acid containing from 8 to 22 carbon atoms and an alcohol selected from the group consisting of methyl alcohol, ethyl alcohol, propyl alcohol, butyl alcohol, ethylene glycol, polyethylene glycol, glycerol, phenol, benzyl alcohol, and cyclohexanol, said polyepoxy ester containing at least two oxirane groups per molecule all of which groups reside in the acyl portion of said ester, the gram moles of original boric acid per 16 grams of oxirane oxygen in original said polyepoxy ester lying within the range of about 0.3 to about 1.2, and all of the acyl groups in said polyepoxy ester having from 8 to 22 carbon atoms.

2. New composition of matter according to claim 1 in which the polyepoxy fatty acid ester is epoxidized soybean oil.

3. The method of preparing new compositions of matter which comprises interacting boric acid and a polyepoxy ester derived from at least one monocarboxylic fatty acid containing from 8 to 22 carbon atoms and an alcohol selected from the group consisting of methyl alcohol, ethyl alcohol, propyl alcohol, butyl alcohol, ethylene glycol, polyethylene glycol, glycerol, phenol, benzyl alcohol, and cyclohexanol, said polyepoxy ester containing at least two oxirane groups per molecule all of which groups reside in the acyl portion of said ester, the gram moles of boric acid per 16 grams of oxirane oxygen in said polyepoxy ester lying within the range of about 0.3 to about 1.2, and all of the acyl groups in said polyepoxy ester having from 8 to 22 carbon atoms.

References Cited in the file of this patent

UNITED STATES PATENTS

| | | |
|---|---|---|
| 1,668,797 | Bannister | May 8, 1928 |
| 2,125,544 | Colbeth | Aug. 2, 1938 |
| 2,185,967 | Priester | Jan. 2, 1940 |
| 2,278,425 | Colbeth | Apr. 7, 1942 |
| 2,386,250 | McNally et al. | Oct. 9, 1945 |
| 2,752,376 | Julian et al. | June 26, 1956 |

OTHER REFERENCES

Wertheim: Textbook of Organic Chemistry, McGraw-Hill Book Co., New York, 1951, pages 243 to 247.